US012704639B2

(12) United States Patent
De Lorenzo et al.

(10) Patent No.: US 12,704,639 B2
(45) Date of Patent: Aug. 11, 2026

(54) BASEBAND ARCHITECTURE FOR GNSS JAMMING MITIGATION

(71) Applicant: Trimble Inc., Westminster, CO (US)

(72) Inventors: David S. De Lorenzo, Palo Alto, CA (US); Andrew Cartmell, Santa Clara, CA (US); William Alexander Lentz, Snohomish, WA (US)

(73) Assignee: Trimble Inc., Westminster, CO (US)

( * ) Notice: Subject to any disclaimer, the term of this patent is extended or adjusted under 35 U.S.C. 154(b) by 358 days.

(21) Appl. No.: 18/515,012

(22) Filed: Nov. 20, 2023

(65) Prior Publication Data

US 2025/0164646 A1 May 22, 2025

(51) Int. Cl.
*G01S 19/21* (2010.01)
*G01S 19/37* (2010.01)

(52) U.S. Cl.
CPC .............. *G01S 19/21* (2013.01); *G01S 19/37* (2013.01)

(58) Field of Classification Search
CPC ................................ G01S 19/21; G01S 19/37
USPC ...................................... 342/357.59, 357.77
See application file for complete search history.

(56) References Cited

U.S. PATENT DOCUMENTS 7,587,171 B2 * 9/2009 Evans ................ H04B 7/18513 455/278.1
8,238,410 B2 * 8/2012 Lennen ................... G01S 19/21 375/348
8,238,863 B2 * 8/2012 Farmer .................. H04B 15/00 455/278.1
9,291,715 B2 * 3/2016 Wang ................... H04B 1/1036
9,395,444 B2 * 7/2016 Subburaj ................. G01S 19/21
10,281,556 B2 * 5/2019 Mahmood ............. G01S 5/0215
10,677,927 B2 * 6/2020 Davies ................... H04K 3/255
11,671,133 B2 * 6/2023 Yu ........................ H04B 1/0007 455/552.1
12,066,551 B2 * 8/2024 Yu .......................... G01S 19/21
12,153,143 B2 * 11/2024 Yu .......................... G01S 19/36
2007/0286264 A1 12/2007 Kontola et al.
(Continued)

FOREIGN PATENT DOCUMENTS

CN 117310750 A * 12/2023 ............. G01S 19/21

OTHER PUBLICATIONS

Extended European Search Report for Application No. 24213783.4-1206, mailed Apr. 14, 2025, 12 pages.

*Primary Examiner* — Chuong P Nguyen
(74) *Attorney, Agent, or Firm* — Kilpatrick Townsend & Stockton LLP

(57) ABSTRACT

Described herein is a baseband circuit and a method of operation thereof for use in a GNSS receiver to mitigate jamming and other interference. The baseband circuit may include a time-domain interference mitigation (TDIM) circuit and a frequency-domain interference mitigation circuit (FDIM) for each of multiple RF paths. The TDIM circuit may include a set of notch filters. A processor coupled with the baseband circuit may compute a direct Fourier transform of digital samples of received satellite signals, generate a set of control parameters based on the DFT of the digital samples, and adjust the TDIM and FDIM circuits using the set of control parameters. The set of control parameters may include filter coefficients for the set of notch filters to reject multiple narrow-band interferers.

20 Claims, 8 Drawing Sheets

(56) References Cited

U.S. PATENT DOCUMENTS

| | | | | |
|---|---|---|---|---|
| 2009/0010366 | A1* | 1/2009 | Wu | H04B 1/1036<br>375/346 |
| 2013/0208838 | A1 | 8/2013 | Wu et al. | |
| 2022/0276389 | A1* | 9/2022 | Yu | G01S 19/21 |
| 2023/0128469 | A1* | 4/2023 | Garrity | G01S 13/347<br>342/129 |
| 2023/0261693 | A1 | 8/2023 | Dafesh et al. | |
| 2025/0116782 | A1* | 4/2025 | Meshcheryakov | G01S 19/21 |

* cited by examiner

BASEBAND ARCHITECTURE FOR GNSS JAMMING MITIGATION

BACKGROUND OF THE INVENTION

Global navigation satellite systems (GNSS) are systems that use medium Earth orbit (MEO) or geosynchronous orbit (GEO) satellites to provide geospatial positioning of receiving devices. Typically, wireless signals transmitted from such satellites can be used by GNSS receivers to determine their position, velocity, and time. Examples of currently operational GNSSs include the United States' Global Positioning System (GPS), Russia's Global Navigation Satellite System (GLONASS), China's BeiDou Satellite Navigation System, the European Union's (EU) Galileo, Japan's Quasi-Zenith Satellite System (QZSS), and the Indian Regional Navigation Satellite System (IRNSS). Today, GNSS receivers are used in a wide range of applications, including navigation (e.g., for automobiles, planes, boats, persons, animals, freight, military precision-guided munitions, etc.), surveying, mapping, and time referencing.

The widespread adoption of GNSS technology has led to its exploitation for malicious purposes. GNSS jamming, a deliberate interference technique, has become a significant cause for concern. Jamming devices transmit signals on the same frequencies used by GNSS satellites, resulting in the disruption of signal reception, thereby causing positioning inaccuracies and, in severe instances, rendering GNSS-based systems entirely nonfunctional. GNSS jamming can be motivated by a variety of factors, including criminal activities seeking to evade tracking, privacy concerns, geopolitical conflicts, and military operations. The consequences of GNSS jamming are far-reaching, impacting not only positioning and navigation but also critical infrastructure, transportation systems, and emergency services. There has been a growing need for innovative methods and systems to detect, mitigate, or counteract these interference techniques.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is an apparatus comprising: a time-domain interference mitigation (TDIM) circuit comprising a set of notch filters, the TDIM circuit configured to receive digital samples of received satellite signals and produce intermediate digital samples; a frequency-domain interference mitigation (FDIM) circuit comprising one or more parallel mitigation paths that perform frequency-domain filtering of the intermediate digital samples to produce output digital samples; and a processor coupled with the TDIM circuit and the FDIM circuit, the processor configured to: compute a direct Fourier transform (DFT) of the digital samples; generate a set of control parameters based on the DFT of the digital samples; and adjust the TDIM circuit and the FDIM circuit using the set of control parameters, the set of control parameters including filter coefficients for the set of notch filters.

Example 2 is the apparatus of example(s) 1, further comprising: an analog-to-digital (A/D) converter configured to generate the digital samples of the received satellite signals.

Example 3 is the apparatus of example(s) 2, further comprising: an RF front end configured to down convert the received satellite signals from radio frequencies to intermediate frequencies.

Example 4 is the apparatus of example(s) 1-3, wherein the processor is further configured to: identify a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency.

Example 5 is the apparatus of example(s) 4, wherein the processor is further configured to: identify a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

Example 6 is the apparatus of example(s) 1-5, wherein the set of control parameters include filter deactivation indicators that indicate which of the set of notch filters are to be bypassed.

Example 7 is the apparatus of example(s) 1-6, wherein each of the parallel mitigation paths includes: a DFT circuit for calculating a hardware DFT of the intermediate digital samples; a mitigation circuit for attenuating values of the hardware DFT of the intermediate digital samples; and an inverse discrete Fourier transform (IDFT) circuit for converting the hardware DFT of the intermediate digital samples into time-domain samples.

Example 8 is the apparatus of example(s) 7, wherein the mitigation circuit is configured to compare bins of the hardware DFT to a threshold and to attenuate the values of any of the bins having values greater than the threshold.

Example 9 is the apparatus of example(s) 8, wherein the set of control parameters include the threshold.

Example 10 is a method comprising: computing, at a processor, a direct Fourier transform (DFT) of digital samples of received satellite signals; generating, at the processor, a set of control parameters based on the DFT of the digital samples; adjusting a time-domain interference mitigation (TDIM) circuit and a frequency-domain interference mitigation (FDIM) circuit using the set of control parameters, the set of control parameters including filter coefficients for a set of notch filters of the TDIM circuit; performing time-domain filtering of the digital samples at the TDIM circuit using the set of notch filters to produce intermediate digital samples; and performing frequency-domain filtering of the intermediate digital samples at the FDIM circuit using one or more parallel mitigation paths of the FDIM circuit to produce output digital samples.

Example 11 is the method of example(s) 10, further comprising: identifying, at the processor, a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency; and identifying, at the processor, a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

Example 12 is the method of example(s) 10-11, wherein the set of control parameters include filter deactivation indicators that indicate which of the set of notch filters are to be bypassed.

Example 13 is the method of example(s) 10-12, further comprising, for each of the parallel mitigation paths: calculating a hardware DFT of the intermediate digital samples; attenuating values of the hardware DFT of the intermediate digital samples; and converting the hardware DFT of the intermediate digital samples into time-domain samples.

Example 14 is the method of example(s) 13, wherein the mitigation circuit is configured to compare bins of the hardware DFT to a threshold and to attenuate the values of any of the bins having values greater than the threshold.

Example 15 is the method of example(s) 14, wherein the set of control parameters include the threshold.

Example 16 is a non-transitory computer-readable medium comprising instructions that, when executed by a processor, cause the processor to perform operations comprising: computing a direct Fourier transform (DFT) of digital samples of received satellite signals; generating a set of control parameters based on the DFT of the digital samples; and adjusting a time-domain interference mitigation (TDIM) circuit and a frequency-domain interference mitigation (FDIM) circuit using the set of control parameters, the set of control parameters including filter coefficients for a set of notch filters of the TDIM circuit; wherein the TDIM circuit is configured to perform time-domain filtering of the digital samples using the set of notch filters to produce intermediate digital samples; wherein the FDIM circuit is configured to perform frequency-domain filtering of the intermediate digital samples using one or more parallel mitigation paths of the FDIM circuit to produce output digital samples.

Example 17 is the non-transitory computer-readable medium of example(s) 16, wherein the operations further comprise: identifying, at the processor, a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency; and identifying, at the processor, a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

Example 18 is the non-transitory computer-readable medium of example(s) 16-17, wherein the set of control parameters include filter deactivation indicators that indicate which of the set of notch filters are to be bypassed.

Example 19 is the non-transitory computer-readable medium of example(s) 16-18, further comprising, for each of the parallel mitigation paths: calculating a hardware DFT of the intermediate digital samples; attenuating values of the hardware DFT of the intermediate digital samples; and converting the hardware DFT of the intermediate digital samples into time-domain samples.

Example 20 is the non-transitory computer-readable medium of example(s) 19, wherein the mitigation circuit is configured to compare bins of the hardware DFT to a threshold and to attenuate the values of any of the bins having values greater than the threshold, and wherein the set of control parameters include the threshold.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
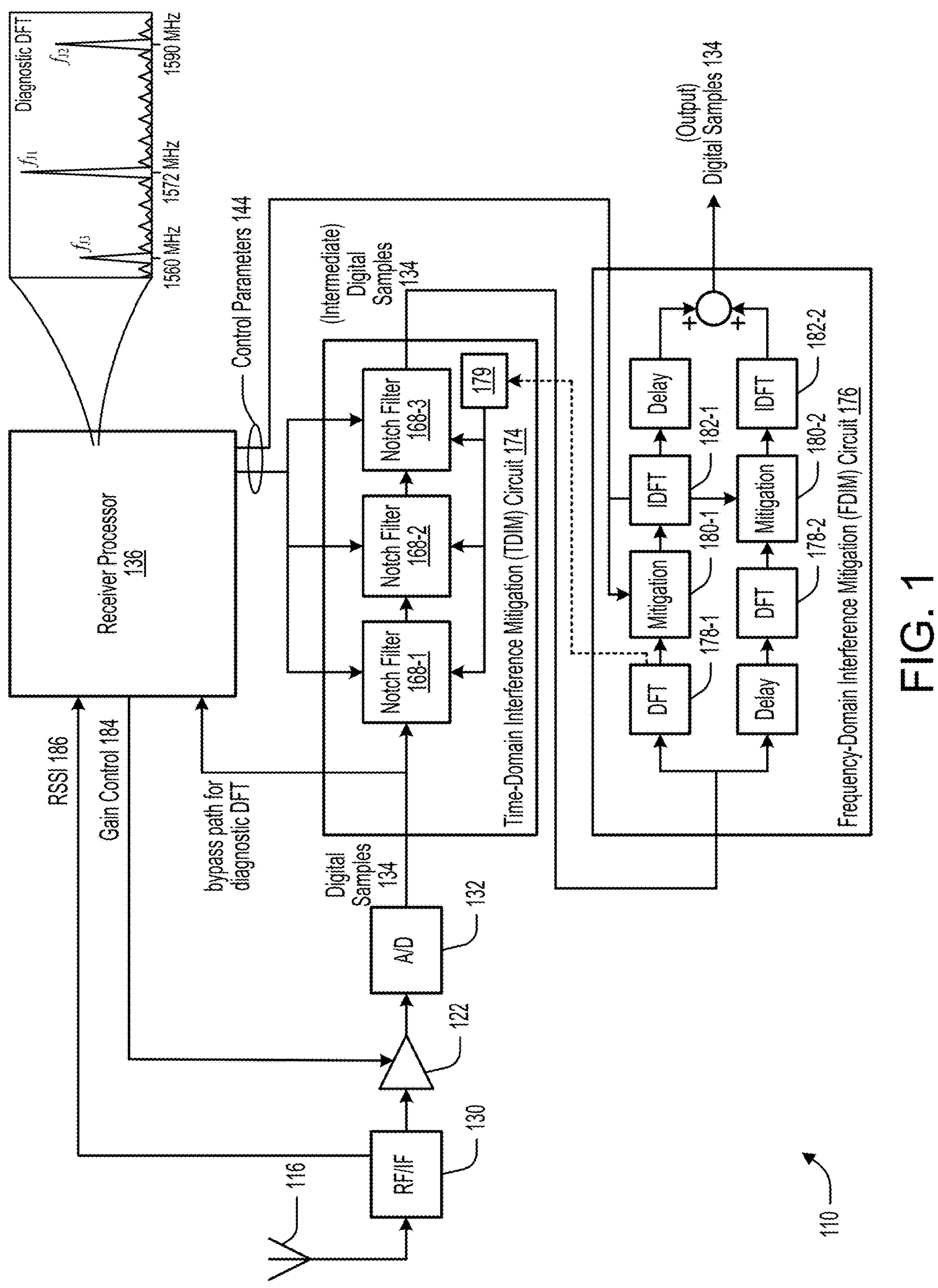
FIG. 1 illustrates an example block diagram of a GNSS receiver.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Some embodiments of the invention relate to a baseband circuit used in a global navigation satellite systems (GNSS) receiver to mitigate jamming and other interference. With respect to the radio frequency (RF) path of a conventional GNSS receiver, embodiments provide for additional hardware elements to be positioned after the analog-to-digital (A/D) converter but before the tracking hardware. As such, elements of the baseband circuit can collectively be thought of as a digital pre-processor that receives the digital samples outputted by the A/D converter and generates a new set of digital samples having the effects of jamming substantially removed. The baseband circuit, alternatively referred to herein as a "baseband ASIC", may include one or more baseband processors, each performing jamming mitigation steps for a set of digital samples corresponding to a particular RF band. Each baseband processor includes one or both of a time-domain interference mitigation (TDIM) circuit or a frequency-domain interference mitigation (FDIM) circuit, the former providing narrow-band mitigation and the latter mitigating time-varying or wide-band interference.

Some embodiments of the invention relate to a method of operating the baseband circuit described above. A central processing unit (CPU), alternatively referred to herein as a "receiver processor", may be tightly coupled with the baseband circuit, by which is meant that the receiver processor may provide control parameters to the baseband circuit for adjusting one or both of the TDIM or FDIM circuits. To generate the control parameters, the CPU receives the digital samples from the A/D converter, prior to the digital samples being pre-processed by the baseband circuit, and performs a spectral analysis to obtain a discrete Fourier transform (DFT) of the digital samples. The CPU identifies peaks in the DFT and records the corresponding frequencies, which are used to set the center frequencies of one or more notch filters of the TDIM circuit. The CPU may further set a threshold to be used by the FDIM circuit for zeroing or reducing frequency components which exceed the threshold.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order to not obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example block diagram of a GNSS receiver 110, in accordance with some embodiments of the present disclosure. GNSS receiver 110 includes an antenna 116 for receiving satellite signals and routing the received satellite signals to an RF front end 130, which down converts the signals from RF to intermediate frequencies (IF). The output of RF front end 130 may be passed through an amplifier 122 for amplifying the received signal and an analog-to-digital (A/D) converter 132 for sampling the received signal to generate digital samples 134. In some examples, RF front end 130 may employ a power detection circuit that measures a received signal strength indicator (RSSI) 186 that quantifies the strength or power level of the incoming wireless signal. A receiver processor 136 may generate a gain control 184 based in part on RSSI 186 to modify a gain setting of amplifier 122.

GNSS receiver 110 may include a TDIM circuit 174 and an FDIM circuit 176 for interference mitigation. TDIM circuit 174 may include several time-domain notch filters 168 for each RF band to mitigate steady-state or quasi-static narrow-band interference. These filters operate serially, meaning that the output from first notch filter 168-1 becomes the input to second notch filter 168-2, and so on until the last filter, whose output becomes the input to FDIM circuit 176. Any of notch filters 168 that are set to an inactive mode by receiver processor 136 are bypassed using bypass logic to ensure that the transit time of samples around the filter is identical to that of samples going through the filter.

The coefficients of notch filters 168 may be synthesized offline and may either be permanently fixed in hardware or loaded into registers at runtime. The filter coefficients are constrained to yield zero group delay and linear phase at each filter output. In some examples, the filters are centered at 0 Hz, so in order to handle a jammer at frequency $f_{J1}$: (1) the input samples to a filter are first mixed by $-f_{J1}$ to put the jammer at 0 Hz, (2) the notch filter is applied, and (3) the output samples to the filter are mixed by $+f_{J1}$ to undo step (1). In step (3), any phase delay through step (2) is compensated for. In some examples, the steps for activating a notch filter, i.e., of allocating a notch filter to mitigate a narrow-band interferer, include a search step to identify narrow-band interferers, a tracking step where each narrow-band interferer is tracked across time, and an allocation step where a notch filter is assigned to mitigate a narrow-band interferer.

In some examples, the search step proceeds as follows. First, time-domain digital samples 134 are sent from TDIM circuit 174 to receiver processor 136 via a bypass path at a particular rate, such as 5 Hz, 10 Hz, 20 Hz, etc. (a rate at which the software-based interference mitigation processing is to take place). Receiver processor 136 uses digital samples 134 to calculate the DFT, which is averaged across several epochs in order to reduce noise and to improve resolving accuracy. The averaged DFT, referred to as the "diagnostic DFT", is searched to identify its maximum value and corresponding frequency $f_{J1}$. Next, the identified spectral peak is excluded during a second search of the diagnostic DFT to identify the next-highest maximum value and corresponding frequency $f_{J2}$. This may be repeated several times until multiple spectral peaks are identified or until no further spectral peaks can be identified.

In some examples, the tracking step proceeds as follows. There are up to several radio frequency interference (RFI) states maintained across time to which the spectral peaks from the search step are compared in terms of frequency and power, those RFI states that are a sufficiently close match to a spectral peak are preserved, and their properties updated with the spectral peak data, whereas those RFI states that no longer match a spectral peak are removed from tracking. Finally, any available (i.e., unmatched) RFI states are assigned a spectral peak in descending order of spectral peak power. Each RFI state may be assigned a quasi-unique identifier for tracking across time.

In some examples, the allocation step proceeds as follows. There are up to several notch filters 168 active across time to which the RFI state identifiers from the tracking step are compared. Those notch filters which share an identifier with an RFI state are preserved, and their properties are updated with the RFI state data (e.g., center frequency and bandwidth), whereas those notch filters which no longer match an RFI state are deactivated. Any available (i.e., inactivated) notch filters are allocated an RFI state in descending order of RFI state power. For a notch filter to be activated for narrow-band interference mitigation, the RFI state from which it receives its allocation must pass several tests, including that (1) the bandwidth is below a threshold, (2) the power exceeds a threshold, and (3) the length of time that the spectral peak has been tracked exceeds a threshold. Further, the power and bandwidth thresholds may vary across and within each RF band, and partly are based on the potential impact of narrow-band interference to GNSS signal tracking accuracy and sensitivity. Finally, the notch filters are sorted in descending order of RFI state power, such that the highest-power RFI state is allocated to and mitigated by the first notch filter, the second-highest-power RFI state is allocated to and mitigated by the second notch filter, and so on until the last activated filter. Control of notch filters 168 is achieved via control parameters 144, which are generated by receiver processor 136.

The above search, tracking, and allocation scheme can be done all in software at a lower rate, however such steps performed in software may not respond quickly enough when a jammer first appears. In some examples, to handle the transient, the hardware does a rough placement of a notch filter before the above software steps kick in. The hardware assist estimates the rough jammer frequency using a hardware DFT (such as DFT circuit 178-1). In some examples, a hardware assist module 179 of TDIM circuit 174 may receive a hardware DFT from DFT circuit 178-1 and may set the center frequencies for notch filters 168 of TDIM circuit 174 based on the hardware DFT (the dashed line in FIG. 1 indicating the hardware assist path through which DFT circuit 178-1 sends the hardware DFT to hardware assist module 179). As such, GNSS receiver may first employ quick-reacting hardware-placed notch filters followed by slow-reacting software-placed notch filters to replace the less accurate hardware-placed notch filters.

In some examples, reading the peak frequency from the hardware DFT may not be accurate enough, so hardware assist module 179 may interpolate the true jammer frequencies from the hardware DFT. The following steps, performed by hardware assist module 179, are several times more accurate than using the raw DFT while still only requiring a small amount of hardware resources:

1. Find the DFT peak and the point on either side of the peak: Left(L), Mid(M), Right(R)
2. Calculate the differences to M: errL=M−L, errR=M−R
3. Normalize the differences with an iterative divide by Mshiftk=M>>k, where the shift by k is used to get a greater resolution from the result:
   normL=iterative_divide(errL, Mshiftk), normR=iterative_divide(errR, Mshiftk)
4. Get the position between DFT points:
   if normL>normR, then the jammer is located right of the Midpoint by scale×(normL−normR)
   else the jammer is located left of the Midpoint by scale×(normR−normL)
5. Steps (1) to (4) may be repeated several times and averaged to obtain better accuracy GNSS receiver 110 may include an FDIM circuit 176 for each RF band for mitigating time-varying or wide-band interference. For each RF band, the output from notch filters 168 of TDIM circuit 174 (whether active or bypassed) is the input to the frequency-domain filter of FDIM circuit 176. The frequency-domain filter operates by calculating the DFT of the input samples, modifying the values of those DFT bins which exceed a threshold, and calculating the inverse discrete Fourier transform (IDFT). The number of time-domain samples input to DFT circuits 178 is chosen such that swept-frequency continuous-wave (CW) or narrow-band interference occupies a suitably small number of frequency-domain bins. In one particular example, at a sampling frequency of 40 Msamples/sec and a swept-frequency CW slew-rate of 1 MHz/μsec, a time-domain input of 128 complex-valued samples represents 2 MHz of frequency-slew of the interferer, or 5% of the 40 MHz DFT frequency spectrum. In another particular example, at a sampling frequency of 60 Msamples/sec and a swept-frequency CW slew-rate of 1 MHz/μsec, a time-domain input of 128 complex-valued samples represents 3 MHz of frequency-slew of the interferer, or 5% of the 60 MHz DFT frequency spectrum.

In the illustrated example, the frequency-domain filter of FDIM circuit 176 includes two DFT-mitigation-IDFT paths (or simply "mitigation paths"), with each path including a DFT circuit 178, a mitigation circuit 180, and an IDFT circuit 182, and with the input to the second path being delayed by one-half of the input buffer length of the first path. In some examples, the frequency-domain filter output may be formed as follows: the first half of the current output of the first path is added to the second half of the previous output of the second path; the second half of the current output of the first path will be added to the first half of the next output of the second path, in accordance with a constant-overlap-add (COLA) reconstruction.

Each of the two parallel mitigation paths of the frequency-domain filter of FDIM circuit 176 may operate as follows: one sample buffer worth of time-domain complex-valued samples is multiplied by an anti-aliasing window function, the DFT of those samples is calculated in hardware at DFT circuits 178, the real-valued magnitude at each frequency bin is determined, the magnitude values are compared to a threshold (the threshold optionally being frequency-dependent), those bins whose magnitudes exceeds the threshold (and possibly one or more neighboring bins) either are set to zero or are reduced such that their new magnitudes equal a target magnitude (the target magnitude optionally being frequency-dependent) at mitigation circuits 180, and the IDFT of the resultant is calculated at IDFT circuits 182. In some embodiments, "keep-out regions" can be imposed within each RF band which are never filtered and "always-blank regions" can be imposed which are always filtered.

In some examples, the threshold for FDIM circuit 176 may be the lower of two values, the first value being the sum of the estimated median of the diagnostic DFT plus a factor (e.g., 10×) times the estimated standard deviation of the diagnostic DFT, and the second value being several decibels (e.g., 5 dB, 10 dB, 15 dB) higher than the estimated median of the diagnostic DFT. One goal of setting the frequency-domain filter threshold is that during quiescent periods very rarely will samples exceed the threshold while during periods when interference is present it is primarily frequency bins containing interference which will exceed the threshold. In some examples, the diagnostic DFT can be used to estimate the transfer function of the analog signal path (i.e., upstream of A/D converter 132). The transfer function can be used to alter the threshold of the frequency-domain filter.

Setting the interference-free signal amplitude input to A/D converter 132, and thus the number of quantization levels occupied by noise, can be an important design consideration. In some examples, it may not be desirable that an interference-free signal should occupy all or substantially all quantization levels, as this may cause immediate A/D converter saturation whenever the input signal power increases rapidly. Furthermore, exciting too few quantization levels can lead to reduced signal-to-noise ratio (SNR) when analog components operate below their optimal design power ranges. Thus, there may be an optimal amount of gain or signal amplification prior to A/D converter 132 which gives sufficient resolution for low-amplitude signals yet leaves margin for high-amplitude signals. Maintaining this optimal amount of gain across various input signal conditions, antenna gain, interference, ambient temperature, and component aging is one purpose of the gain control function.

In some examples, GNSS receiver 110 may implement a high-rate gain control loop and a low-rate gain control loop. The high-rate gain control loop may react quickly in order to maintain desired gain when interference is detected. In this case, changes in gain are primarily due to fluctuating interference power and varying distance between antenna 116 and the interferer(s). The low-rate gain control loop may react more slowly in order to maintain desired gain during "normal operation". In this case, changes in gain are primarily due to temperature variations and the long-term drift of analog components.

The high-rate gain control loop can monitor overflow of A/D converter 132. This mode of operation seeks to control the fraction of samples which overflow A/D converter 132 (e.g., such that no more than 0.25% or 0.5% of samples overflow A/D converter 132). This mode is fast-reacting and prevents significant overflow of A/D converter 132 from persisting for more than a few milliseconds. The low-rate gain control loop monitors post-A/D converter 132 noise power and receiver input power (i.e., RSSI 186). When GNSS receiver 110 is unjammed or the interference is mild (e.g., RSSI 186 is less than or equal to −20 dBm), then the low-rate gain control loop seeks to match the estimated post-A/D converter 132 noise power with a desired noise power set-point (e.g., 30 dB in post-A/D converter 132 dimensionless units). When the input power is moderate or high (e.g., RSSI 186 is greater than −20 dBm), yet A/D converter 132 is not overflowing, then the low-rate gain control loop seeks to maintain the gain at or below its steady-state unjammed level (i.e., that gain which yielded a post-A/D converter 132 noise power of 30 dB).

Electrical components have an optimal operating range in terms of input power, and power above this optimal range can lead to signal distortion or compression. In a connected series of electrical components, the lowest compression value can determine the signal power threshold for the entire circuit. In order to protect against this situation, input power to A/D converter 132, TDIM circuit 174, and FDIM circuit 176 can be reduced via programmable signal attenuators which are upstream of their associated circuits and sub-circuits. The high-rate gain control loop also "prices-in" changes made to the programmable attenuators which are upstream of the gain stage (which includes amplifier 122) by increasing (or decreasing) the gain value of gain control 184 in order to compensate for lower (or higher power) following increased (or decreased) attenuation.

Figure 2:
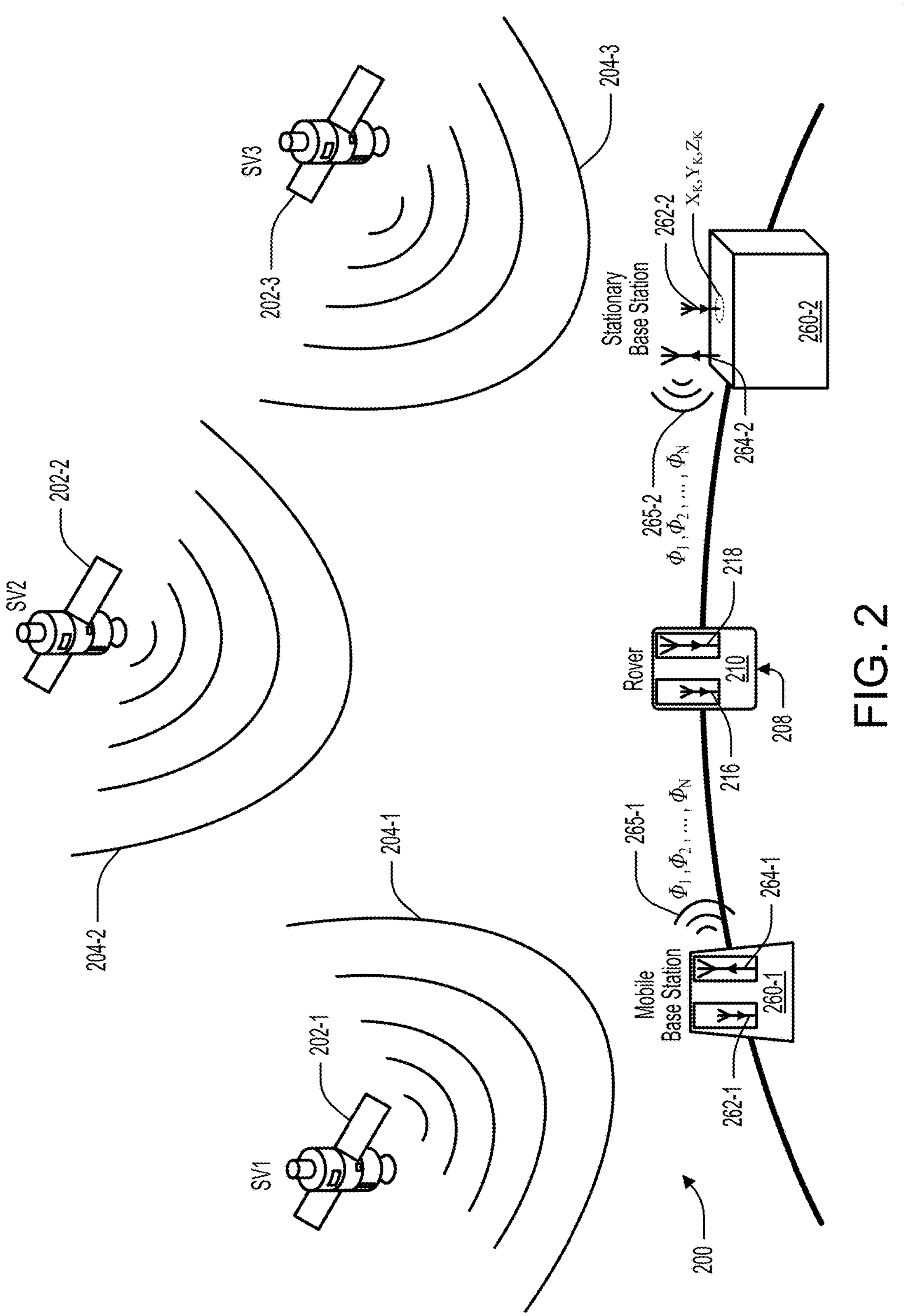
FIG. 2 illustrates an example implementation of a GNSS receiver equipped within a rover.

FIG. 2 illustrates an example implementation of a GNSS receiver 210 equipped within a rover 208, in accordance with some embodiments of the present disclosure. FIG. 2 further illustrates a mobile base station 260-1 and a stationary base station 260-2 operating within a GNSS 200. GNSS 200 includes one or more GNSS satellites 202, i.e., space vehicles (SV), in orbit above rover 208 and base stations 260. GNSS satellites 202 may continuously, periodically, or intermittently broadcast wireless signals 204 containing PRN codes modulated onto carrier frequencies (e.g., L1 and/or L2 carrier frequencies). Wireless signals 204 may include satellite position data, referred to as "ephemeris data", which indicates the satellite's current position and optionally the satellite's velocity. Furthermore, wireless signals 204 of different GNSS satellites 202 may include different PRN codes that identify each particular GNSS satellite such that receivers may associate different received signals to different GNSS satellites 202.

For example, GNSS satellite 202-1 may broadcast wireless signals 204-1 which contain a different PRN code and different ephemeris data than those contained in wireless signals 204-2 broadcasted by GNSS satellite 202-2. Similarly, GNSS satellite 202-3 may broadcast wireless signals 204-3 which contain a different PRN code and different ephemeris data than those contained in wireless signals 204-1 and 204-2 broadcasted by GNSS satellites 202-1 and 202-2, respectively. One or more of wireless signals 204 may be received by a GNSS antenna 216 of GNSS receiver 210. GNSS antenna 216 may be a patch antenna, a turnstile antenna, a helical antenna, a parabolic antenna, a phased-array antenna, a resistive plane antenna, a choke ring antenna, a radome antenna, among other possibilities.

Each of GNSS satellites 202 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, GNSS satellite 202-1 may be a GPS satellite and may transmit wireless signals having a GPS L1 C/A signal type (i.e., wireless signals having frequencies within the GPS L1 band and having been modulated using C/A code). GNSS satellite 202-1 may additionally or alternatively transmit wireless signals having a GPS L2C signal type (i.e., wireless signals having frequencies within the GPS L2 band and having been modulated using L2 civil codes). In some embodiments, GNSS satellite 202-1 may additionally be a Galileo satellite and may transmit wireless signals having a Galileo signal type (e.g., Galileo E1). Accordingly, a single satellite may include the ability to transmit wireless signals of a variety of signal types.

GNSS receiver 210 may use the pseudoranges between itself and GNSS satellites 202-1, 202-2, and 202-3 to generate a position estimate through trilateration. For example, multiple spheres may be generated having center locations corresponding to the locations of GNSS satellites 202 and radii corresponding to the pseudoranges, with the intersection point(s) of the spheres used to determine the position estimate for GNSS receiver 210. The position estimate may be continuously, periodically, or intermittently updated by generating new pseudoranges and performing trilateration using the new pseudoranges. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Mobile base station 260-1 and stationary base station 260-2 may include GNSS antennas 262-1 and 262-2, respectively, where GNSS antenna 262-2 is positioned at a known position (e.g., $X_K$, $Y_K$, $Z_K$). Mobile base station 260-1 may be movable such that multiple mobile base stations 260-1 may be brought within or surrounding a project site so as to provide high-accuracy position estimates. Each of GNSS antennas 262 may be similar to GNSS antenna 216 and may be configured to receive one or more of wireless signals 204. For example, each of GNSS antennas 262 may be a patch antenna, a turnstile antenna, a helical antenna, a parabolic antenna, a phased-array antenna, a resistive plane antenna, a choke ring antenna, a radome antenna, among other possibilities.

Each of base stations 260 may send a correction signal 265 containing correction data to GNSS receiver 210. The correction data is used by GNSS receiver 210 to improve the accuracy of its position estimate. In some embodiments, the correction data includes a 3D offset amount (e.g., $X_C$, $Y_C$, $Z_C$) for modifying the position estimate of GNSS receiver 210. In one example, position estimates of stationary base station 260-2 made using GNSS antenna 262-2 are compared to the known position and the correction data may be generated based on the comparison. In some embodiments, the correction data includes any one of various types of raw or processed satellite data.

Correction signals 265 containing the correction data may be wirelessly transmitted by base stations 260 using correction antennas 264 and may be received by GNSS receiver 210 using a correction antenna 218. The correction signals 265 may be transmitted continuously, periodically, or intermittently by base stations 260. In some embodiments, correction signals 265 are transmitted over a set of wireless frequencies outside the GNSS frequencies (e.g., lower than the GNSS frequencies). In some embodiments, correction antennas 264 may be used for transmission only and correction antenna 218 may be used for reception only, although in some embodiments additional handshaking between GNSS receiver 210 and base stations 260 may occur.

In some examples, GNSS receiver 210 may use RTK techniques to estimate its position with centimeter-level accuracy by making carrier phase measurements of the received wireless signals 204. These carrier phase measurements, which may be referred to as "rover carrier phase measurements", may be analyzed along with carrier phase measurements at one or both of base stations 260, which may be referred to as "reference carrier phase measurements", to determine a vector (rover-to-base vector) between the position of rover 208 and the position(s) of base station(s) 260. This rover-to-base vector may be combined with the known positions of base stations 260 to estimate the position of rover 208. When using RTK techniques, the correction data may contain the reference carrier phase measurements, which may include a plurality of carrier phases $\Phi_1, \Phi_2, \ldots, \Phi_N$, where N is the number of GNSS satellites. In some examples, the correction data may further include the known position (e.g., $X_K, Y_K, Z_K$) of base station 260-2.

Figure 3:
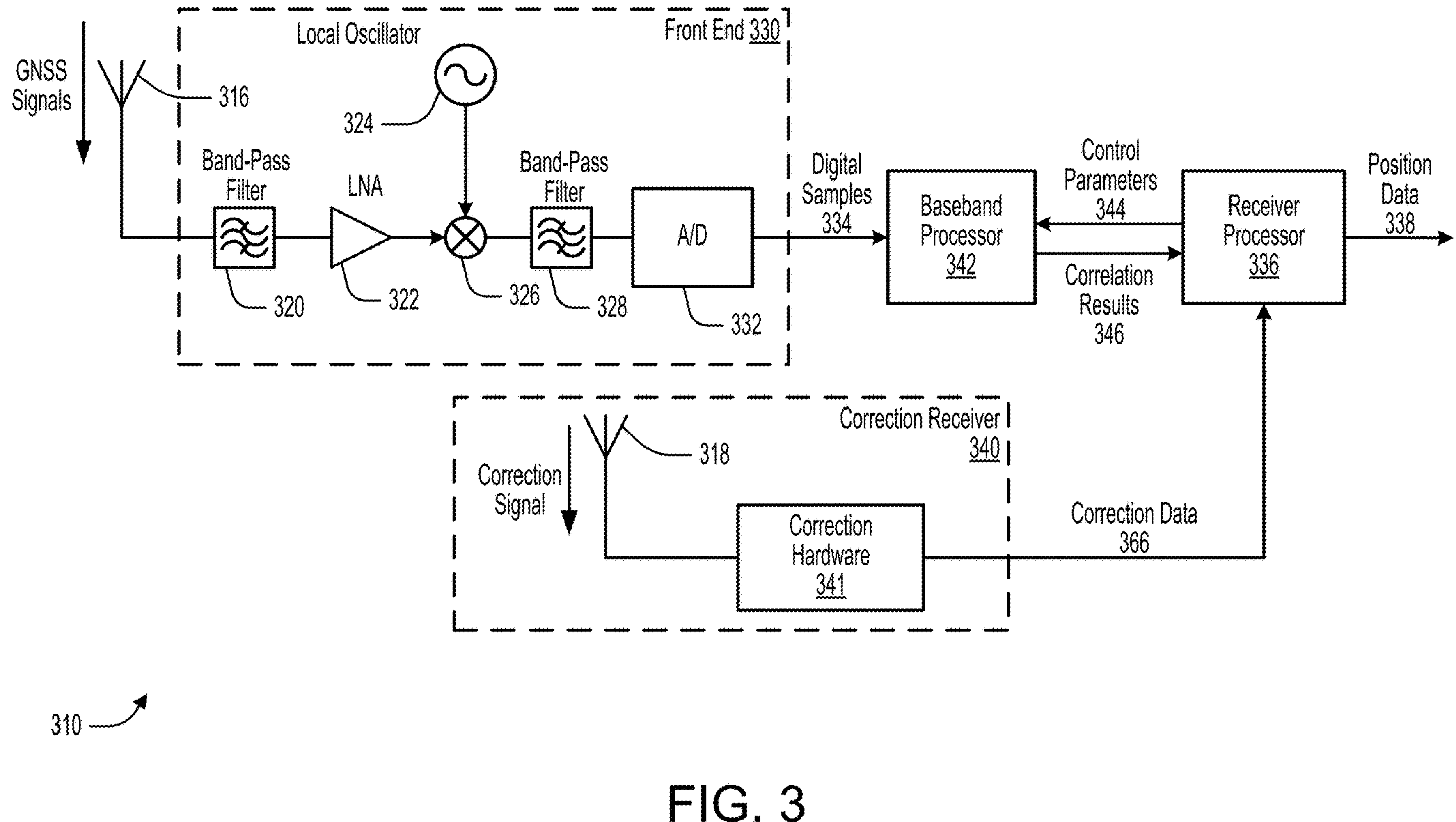
FIG. 3 illustrates an example block diagram of a GNSS receiver.

FIG. 3 illustrates an example block diagram of a GNSS receiver 310, in accordance with some embodiments of the present disclosure. GNSS receiver 310 includes antenna 316 for receiving wireless signals 304 and sending/routing wireless signals 304 to a RF front end 330. RF front ends are well known in the art, and in some instances include a band-pass filter 320 for initially filtering out undesirable frequency components outside the frequencies of interest, a low-noise amplifier (LNA) 322 for amplifying the received signal, a local oscillator 324 and a mixer 326 for down converting the received signal from RF to IF, a band-pass filter 328 for removing frequency components outside IF, and an A/D converter 332 for sampling the received signal to generate digital samples 334.

In some instances, RF front end 330 includes additional or fewer components than that shown in FIG. 3. For example, RF front end 330 may include a second local oscillator (90 degrees out of phase with respect to the first), a second mixer, a second band-pass filter, and a second A/D converter for generating digital samples corresponding to the quadrature component of the received satellite signals. Digital samples corresponding to the in-phase component of the received satellite signals and digital samples corresponding to the quadrature component of the received satellite signals may both be sent to a baseband processor 342. In some embodiments, digital samples corresponding to both in-phase and quadrature components may be included in digital samples 334.

Other components within RF front end 330 may include a phase-locked loop (PLL) for synchronizing the phase of local oscillator 324 with the phase of the received signal, and a phase shifter for generating a second mixing signal using local oscillator 324 that is 90 degrees out of phase with local oscillator 324. In some embodiments, RF front end 330 does not include band-pass filter 320 and LNA 322. In some embodiments, A/D converter 332 is coupled directly to antenna 316 and samples the RF signal directly without down-conversion to IF. In some embodiments, RF front end 330 only includes band-pass filter 320 and A/D converter 332. Other possible configurations of RF front end 330 are possible.

Digital samples 334 generated by RF front end 330 may be sent to a baseband processor 342, which may perform interference mitigation as well as correlations on digital samples 334 using local codes. Operation of baseband processor 342 may be controlled by control parameters 344 generated by a receiver processor 336. Baseband processor 342 may generate correlation results 346 based on digital samples 334 and control parameters 344 and send these results to receiver processor 336. In some embodiments, one or more operations performed by baseband processor 342 may alternatively be performed by receiver processor 336. In some embodiments, baseband processor 342 is implemented as a field-programmable gate array (FPGA). In some embodiments, operations performed by baseband processor 342 are performed entirely in software using digital signal processing (DSP) techniques.

Based on multiple pseudoranges corresponding to multiple GNSS satellites, as well as correction data 366 generated by a correction receiver 340 having correction hardware 341, receiver processor 336 may generate and output position data 338 comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 338 may be outputted to be displayed to a user, transmitted to a separate device (e.g., computer, smartphone, server, etc.) via a wired or wireless connection, or further processed, among other possibilities.

Figure 4:
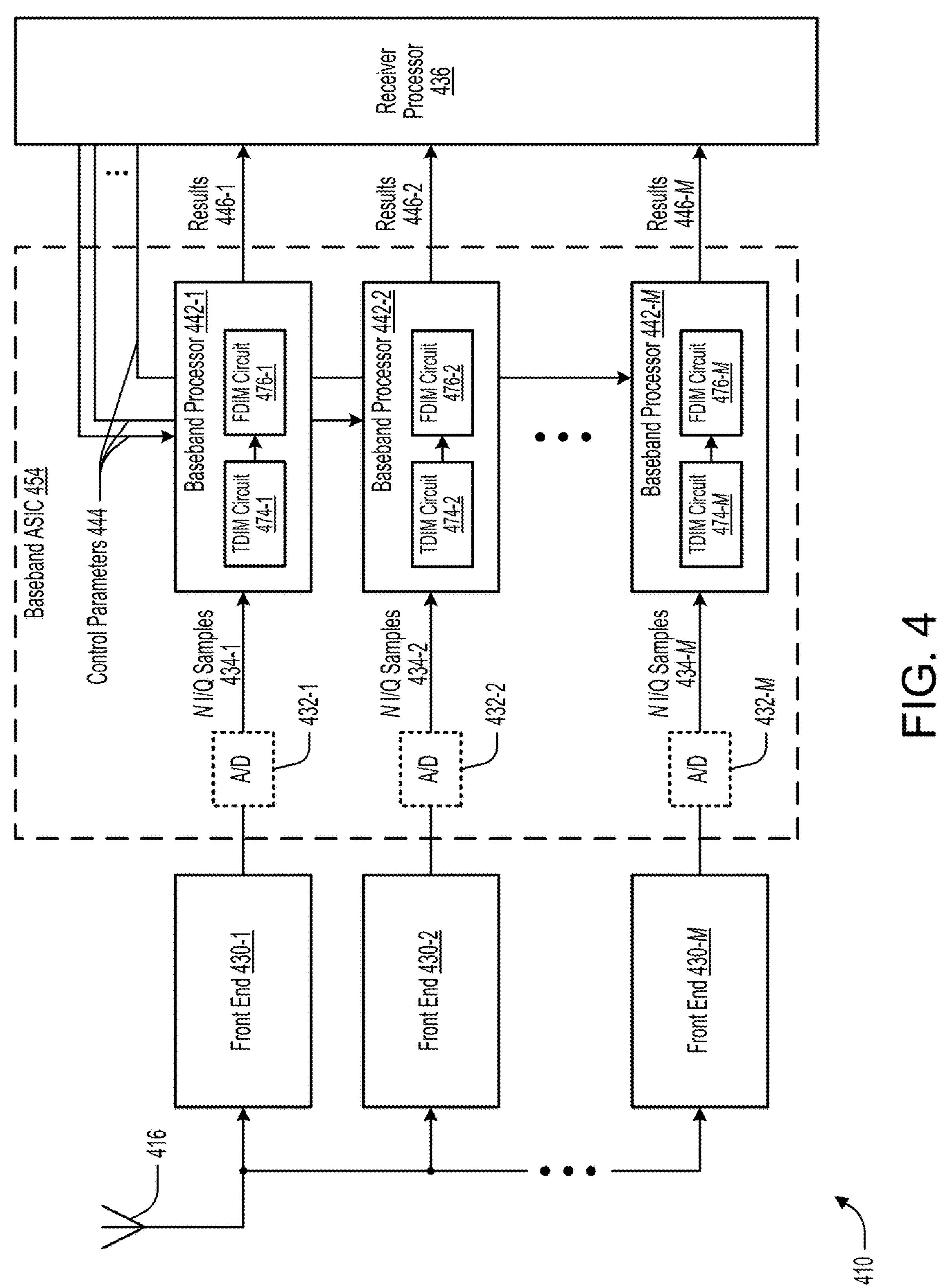
FIG. 4 illustrates an example block diagram of a GNSS receiver implemented as a multi-channel GNSS receiver.

FIG. 4 illustrates an example block diagram of a GNSS receiver 410 implemented as a multi-channel GNSS receiver, in accordance with some embodiments of the present disclosure. In the illustrated example, GNSS receiver 410 includes a GNSS antenna 416 and M front ends 430, each configured to generate and output N I/Q digital samples 434 for respective RF paths. GNSS receiver 410 may include M baseband processors 442, each configured to receive a respective set of I/Q samples 434. Each of baseband processors 442 may include a TDIM circuit 474 and an FDIM circuit 476 for interference mitigation, each circuit having adjustable parameters that are controlled by receiver processor 436 via control parameters 444. Each of baseband processors 442 may generate and output results 446 (e.g., correlation results) that are fed into receiver processor 436. In some examples, baseband processors 442 may be implemented on a baseband ASIC 454. Optionally, in some examples, A/D converters 432 can be included in baseband ASIC 454 instead of front ends 430, such that baseband ASIC 454 directly receives down converted satellite signals from front ends 430.

Each of front ends 430 and baseband processors 442 may be configured to process different RF bands and/or GNSS signal types. In one implementation, GNSS receiver 410 may be configured to process GPS L1/L2/L5, GLONASS L1/L2/L3, and BeiDou B1, B2 signals. In various embodiments, such signals may be processed sequentially, concurrently, or simultaneously. In some embodiments, each of front ends 430 may be configured to process a single GNSS signal type while each of baseband processors 442 may be configured to process any GNSS signal type. For example, in one implementation, front end 430-1 may be configured to process only GPS L1 signals and front end 430-2 may be configured to process only GPS L2 signals while each of baseband processors 442-1 and 442-2 may be configured to process both GPS L1 signals and GPS L2 signals. Other possibilities are contemplated.

Figure 5:
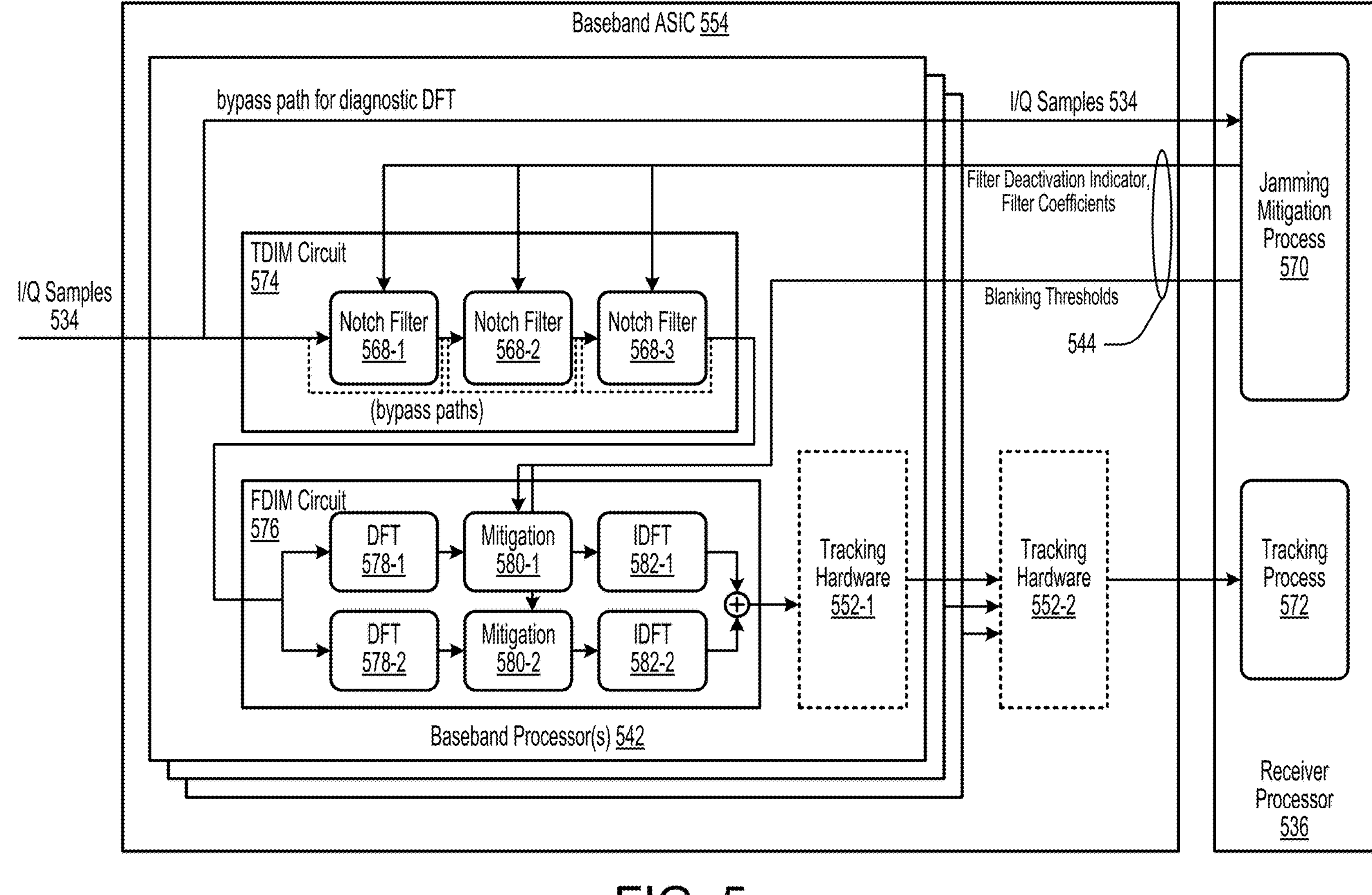
FIG. 5 illustrates an example block diagram of a baseband ASIC and a receiver processor.

FIG. 5 illustrates an example block diagram of a baseband ASIC 554 and a receiver processor 536, in accordance with some embodiments of the present disclosure. In the illustrated example, baseband ASIC 554 includes one or more baseband processors 542, each receiving I/Q samples 534 for a respective RF path and processing the samples using a TDIM circuit 574 and an FDIM circuit 576 for interference mitigation. For each RF band, TDIM circuit 574 may include one or more notch filters 568 to mitigate steady-state or quasi-static narrow-band interference. FDIM circuit 176 may include one or more parallel mitigation paths for each RF band for mitigating time-varying or wide-band interference, with each mitigation path including a DFT circuit 578, a mitigation circuit 580, and an IDFT circuit 582. Control of notch filters 568 and mitigation circuit 580 is performed via control parameters 544 generated by a receiver processor 536.

In some examples, receiver processor 536 may execute a jamming mitigation process 570 to adjust TDIM circuit 574 and FDIM circuit 576. Jamming mitigation process 570 may be executed using compiled code that is loaded into receiver processor 536 for execution. In some examples, jamming mitigation process 570 may begin by receiver processor 536 receiving I/Q samples 534 for a particular RF path. Next, for each RF path, receiver processor 536 may compute a diagnostic DFT of I/Q samples 534 in software by using an iterative computation that loops through the entire sequence of I/Q samples 534 for each frequency bin k of the diagnostic DFT X[k]. Receiver processor 536 may identify multiple spectral peaks in the diagnostic DFT and the corresponding frequencies, and may allocate different spectral peaks to different notch filters 568.

In one example, receiver processor 536 may identify a first spectral peak having a maximum value in the diagnostic DFT and a first frequency corresponding to the first spectral peak. A first narrow-band interferer may be considered to emit at the first frequency. Receiver processor 536 may allocate a first notch filter 568-1 to the first narrow-band interferer and may generate filter coefficients for notch filter 568-1 that cause notch filter 568-1 to have a stop band centered at the first frequency. Receiver processor 536 may also generate the filter coefficients such that the stop band has a sufficient bandwidth to reject the first narrow-band interferer.

Receiver processor 536 may allocate a second notch filter 568-2 to a second narrow-band interferer in a similar manner. For example, receiver processor 536 may identify a second spectral peak having a next-highest maximum value in the diagnostic DFT and a second frequency corresponding to the second spectral peak. The second narrow-band interferer may be considered to emit at the second frequency. Receiver processor 536 may allocate notch filter 568-2 to the second narrow-band interferer and may generate filter coefficients for notch filter 568-2 that cause notch filter 568-2 to have a stop band centered at the second frequency. Receiver processor 536 may also generate the filter coefficients such that the stop band has a sufficient bandwidth to reject the second narrow-band interferer.

Receiver processor 536 may allocate a third notch filter 568-3 to a third narrow-band interferer in a similar manner. Alternatively, one or more of notch filters 568 may be deactivated by receiver processor 536 setting one or more filter activate/deactivate indicators (or "filter deactivation indicators") to indicate such. In one particular example, in response to receiver processor 536 failing to identify a second or third spectral peak, receiver processor 536 may generate filter deactivation indicators to indicate that notch filter 568-1 is activated and that notch filters 568-2 and 568-3 are deactivated. In this example, notch filters 568-2 and 568-3 are bypassed via bypass paths as shown in FIG. 5. In another example, in response to receiver processor 536 failing to identify any spectral peaks, receiver processor 536 may generate filter deactivation indicators to indicate that all notch filters 568 are deactivated. In another example, in response to receiver processor 536 identifying three spectral peaks, receiver processor 536 may generate filter deactivation indicators to indicate that all notch filters 568 are activated. Accordingly, control parameters 544 may include, for each of notch filters 586, a filter deactivation indicator and/or filter coefficients corresponding to a desired center frequency and a desired filter bandwidth.

For each RF band, the output from notch filter 168-3 (whether activated or bypassed) is a set of intermediate digital samples (or intermediate I/Q samples), which serve as the input to the frequency-domain filter of FDIM circuit 176, which comprises one or more parallel mitigation paths. Each mitigation path includes a DFT circuit 578 for calculating a hardware DFT of the intermediate digital samples, a mitigation circuit 580 for attenuating values of the hardware DFT, and an IDFT circuit 582 for converting the hardware DFT back into time-domain digital samples. Mitigation circuits 580 may, for example, compare bins of the hardware DFT to a threshold and attenuate (e.g., set to zero) the values of any of the bins having values greater than the threshold. Furthermore, each mitigation path may include appropriate window function blocks and delay blocks so that each mitigation path may operate on a different subset of the intermediate digital samples.

In some examples, by receiver processor 536 executing jamming mitigation process 570, receiver processor 536 may set the thresholds used by mitigation circuits 580 by including the thresholds in control parameters 544. These thresholds may be set based on an analysis of the diagnostic DFT, may be specified by a user, or may be predetermined by the system. The thresholds may also be frequency dependent, with certain "keep-out regions" imposed within each RF band which are never filtered as well as "always-blank regions" which are always filtered. The outputs of the parallel mitigation paths may be combined (e.g., summed) to produce output digital samples, which are fed into tracking hardware 552 to generate data to be used in a tracking process 572.

Figure 6:
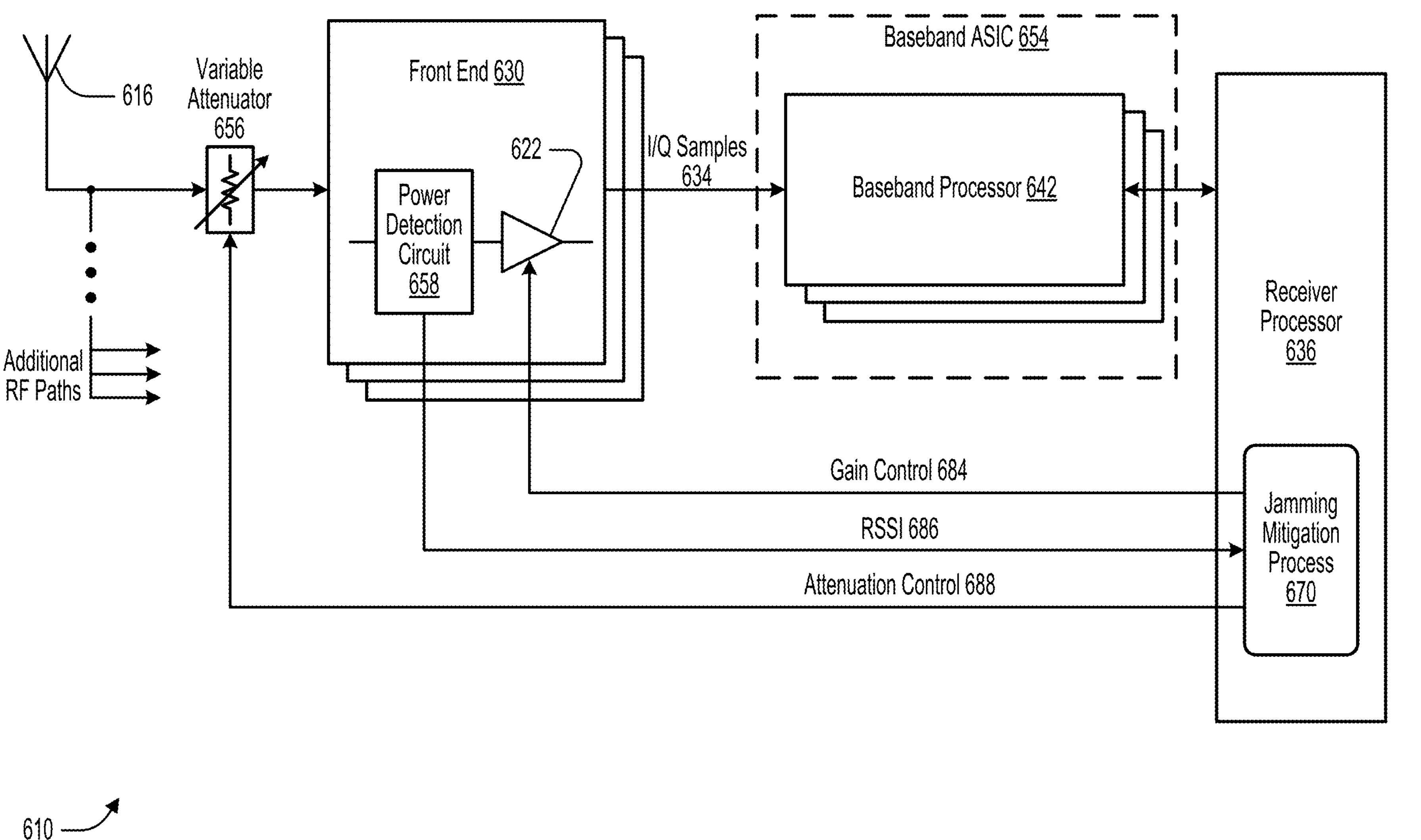
FIG. 6 illustrates an example block diagram of a GNSS receiver.

FIG. 6 illustrates an example block diagram of a GNSS receiver 610, in accordance with some embodiments of the present disclosure. GNSS receiver 610 includes an antenna 616 for receiving satellite signals, a variable attenuator 656 for attenuating the received satellite signals prior to down conversion by front end 630, a power detection circuit 658 for measuring an RSSI 686 that quantifies the power level of the received satellite signals, and an amplifier 622 for amplifying (or attenuating) the received satellite signals after down conversion by front end 630. GNSS receiver 610 may further include a baseband ASIC 654 having a set of baseband processors 642 receiving I/Q samples 634 from respective RF paths.

While executing jamming mitigation process 670 (and in addition to or alternative to the steps described in reference to jamming mitigation process 570 in FIG. 5) receiver processor 636 may generate a gain control 684 to modify a gain setting of amplifier 622 and/or an attenuation control 688 to modify an attenuation setting of variable attenuator 656. As described in reference to FIG. 1, an attenuation control can be implemented to protect electrical components from signal distortion or compression based on RSSI 686 for each RF path. When elevated signal power is detected, an attenuation control loop can adjust the attenuation setting (via attenuation control 688) of variable attenuator 656. As also described in reference to FIG. 1, a high-rate gain control loop and a low-rate gain control loop can be implemented to prevent significant overflow of the A/D converter and to enable sufficient resolution for low-amplitude signals. When interference is detected, the high-rate gain control loop can adjust the gain setting (via gain control 684) of amplifier 622 to maintain a desired gain. The low-rate gain control loop matches the estimated post-A/D converter noise power with a desired noise power set-point by adjusting the gain setting (via gain control 684).

In this way, attenuation control imposes a signal power ceiling on the input to front end 630 during conditions of excessively high input power which could cause signal distortion or compression to electrical components, whereas gain control achieves a balance between, on the one hand, boosting signal power of the input to baseband processor 642 in order to give sufficient resolution for low-amplitude signals and, on the other hand, not boosting signal power so much as to result in A/D converter saturation caused by high-amplitude signals. Furthermore, since amplifier 622 is downstream in the signal path from variable attenuator 656, gain control 684 also is required to modify the gain setting of amplifier 622 in response to changes in attenuation setting of variable attenuator 656 commanded by attenuation control 688.

Figure 7:
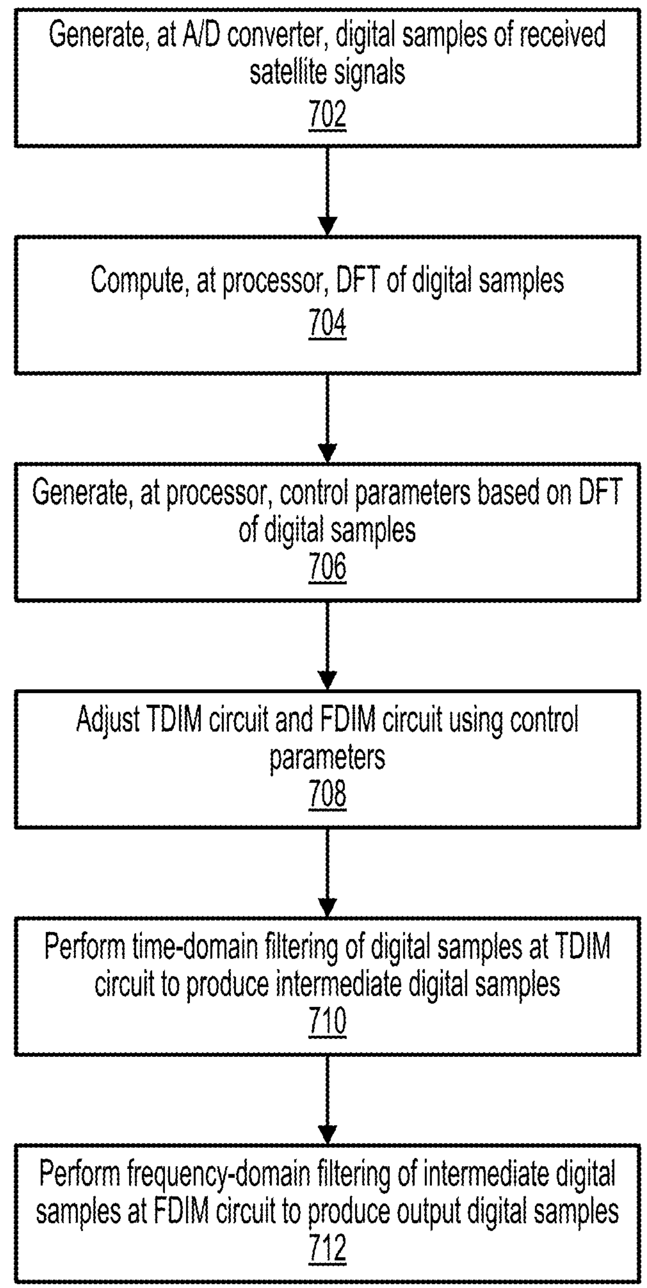
FIG. 7 illustrates an example method of operating a baseband circuit to mitigate jamming and other interference.
Figure 7:

FIG. 7 illustrates a method 700 of operating a baseband circuit (e.g., baseband ASICs 454, 554, 654) to mitigate jamming and other interference, in accordance with some embodiments of the present disclosure. Steps of method 700 may be performed in any order and/or in parallel, and one or more steps of method 700 may be optionally performed. One or more steps of method 700 may be performed by one or more processors, such as a receiver processor. Method 700 may be implemented as a computer-readable medium or computer program product comprising instructions which, when the program is executed by one or more processors, cause the one or more processors to carry out the steps of method 700.

At step 702, digital samples (e.g., digital samples 134, 334, 434, 534, 634) of received satellite signals are generated at an A/D converter (e.g., A/D converters 132, 332, 432).

At step 704, a DFT of the digital samples is computed at a processor (e.g., receiver processors 136, 336, 436, 536, 636). The processor may be coupled with a TDIM circuit (e.g., TDIM circuits 174, 474, 574) and an FDIM circuit (e.g., FDIM circuits 176, 476, 576). The TDIM circuit may include a set of notch filters (e.g., notch filters 168, 568). The FDIM circuit may include one or more parallel mitigation paths.

At step 706, a set of control parameters (e.g., control parameters 144, 344, 444, 544) are generated at the processor based on the DFT of the digital samples. The set of control parameters may include filter coefficients for the set of notch filters. The set of control parameters may include filter deactivation indicators that indicate which of the set of notch filters are to be deactivated and bypassed. The set of control parameters may include a threshold to be used by the FDIM circuit for attenuating values of a hardware DFT that are greater than the threshold. Step 706 may include identifying, at the processor, one or more spectral peaks in the DFT of the digital samples and one or more frequencies corresponding to the one or more spectral peaks. Step 710 may include generating the set of control parameters to include filter coefficients for the one or more notch filters such that the one or more notch filters include one or more stop bands centered at the one or more frequencies.

At step 708, the TDIM circuit and/or the FDIM circuit are adjusted using the set of control parameters. The set of notch filters may be activated or deactivated in accordance with the filter deactivation indicators. The set of notch filters may be adjusted in accordance with the filter coefficients. The FDIM circuit may be adjusted to employ the threshold to identify and attenuate values of the hardware DFT that are greater than the threshold.

At step 710, time-domain filtering of the digital samples is performed at the TDIM circuit using the set of notch filters to produce intermediate digital samples.

At step 712, frequency-domain filtering of the intermediate digital samples is performed at the FDIM circuit using one or more parallel mitigation paths of the FDIM circuit to produce output digital samples. Step 712 may include, for each of the parallel mitigation paths, calculating a hardware DFT of the intermediate digital samples using a DFT circuit (e.g., DFT circuits 178, 578), attenuating values of the hardware DFT of the intermediate digital samples using a mitigation circuit (e.g., mitigation circuits 180, 580), and converting the hardware DFT of the intermediate digital samples into time-domain samples using an IDFT circuit (e.g., IDFT circuits 182, 582).

Figure 8:
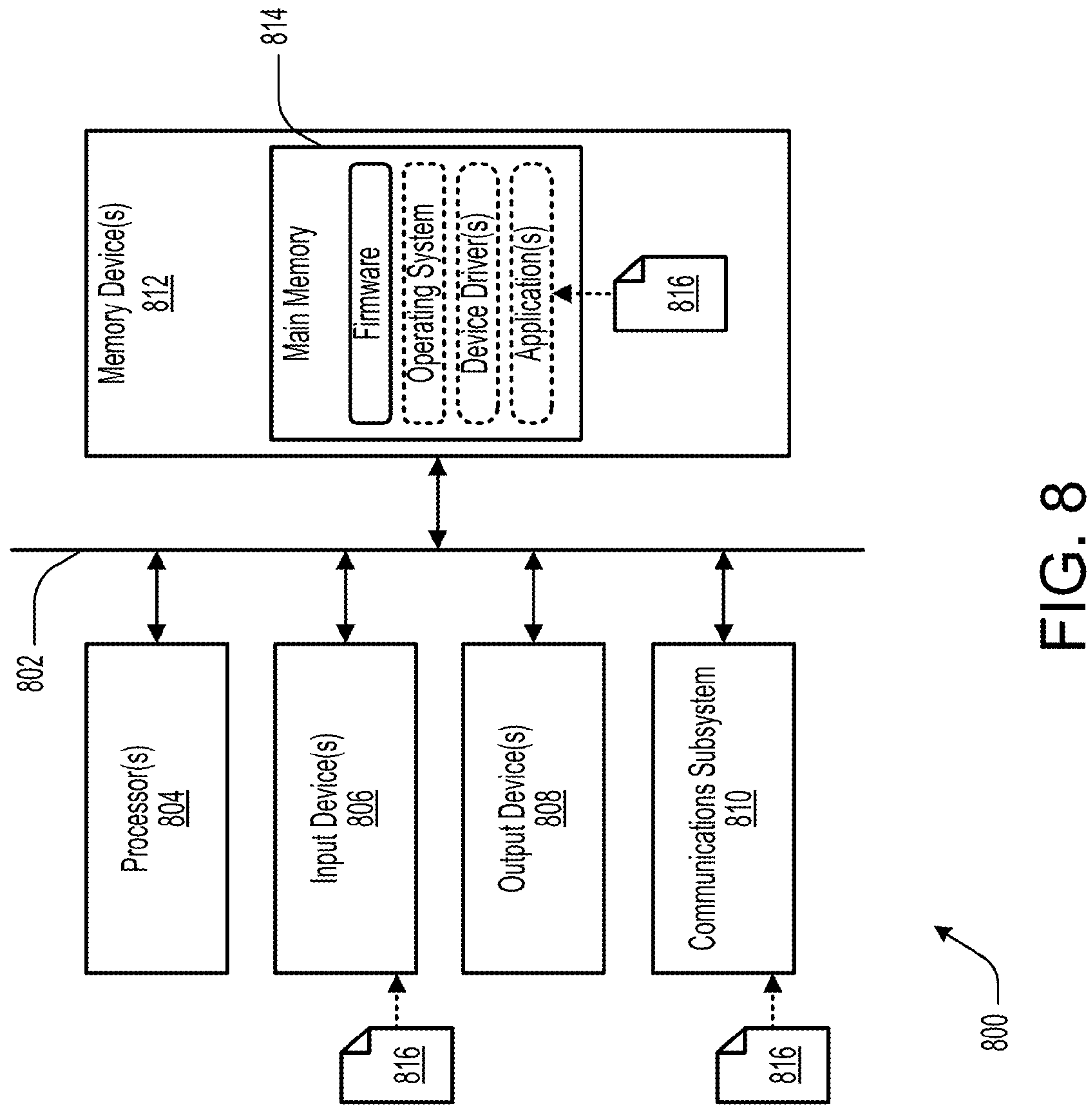
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. For example, in various embodiments, computer system 800 may be incorporated into receiver processors 136, 336, 436, 536, 636 and/or may be configured to perform method 700. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses that connect the pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the address and data buses of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 816, which are executable by computer system 800. In one example, such instructions 816 may be received by computer system 800 using communications subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 800. For example, the non-transitory computer-readable medium may be one of memory device(s) 812 (as shown in FIG. 8). In some cases, the non-transitory computer-readable medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human-readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus comprising:

a time-domain interference mitigation (TDIM) circuit comprising a set of notch filters, the TDIM circuit configured to receive digital samples of received satellite signals and produce intermediate digital samples;

a frequency-domain interference mitigation (FDIM) circuit comprising one or more parallel mitigation paths that perform frequency-domain filtering of the intermediate digital samples to produce output digital samples; and a processor coupled with the TDIM circuit and the FDIM circuit, the processor configured to:

compute a discrete Fourier transform (DFT) of the digital samples;

generate a set of control parameters based on the DFT of the digital samples; and adjust the TDIM circuit and the FDIM circuit using the set of control parameters, the set of control parameters including filter coefficients for the set of notch filters.

2. The apparatus of claim 1, further comprising:

an analog-to-digital (A/D) converter configured to generate the digital samples of the received satellite signals.

3. The apparatus of claim 2, further comprising:

an RF front end configured to down convert the received satellite signals from radio frequencies to intermediate frequencies.

4. The apparatus of claim 1, wherein the processor is further configured to:

identify a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency.

5. The apparatus of claim 4, wherein the processor is further configured to:

identify a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

6. The apparatus of claim 1, wherein the set of control parameters include filter deactivation indicators that indicate which of the set of notch filters are to be bypassed.

7. The apparatus of claim 1, wherein each of the parallel mitigation paths includes:

a DFT circuit for calculating a hardware DFT of the intermediate digital samples;

a mitigation circuit for attenuating values of the hardware DFT of the intermediate digital samples; and an inverse discrete Fourier transform (IDFT) circuit for converting the hardware DFT of the intermediate digital samples into time-domain samples.

8. The apparatus of claim 7, wherein the mitigation circuit is configured to compare bins of the hardware DFT to a threshold and to attenuate the values of any of the bins having values greater than the threshold.

9. The apparatus of claim 8, wherein the set of control parameters include the threshold.

10. A method comprising:

computing, at a processor, a discrete Fourier transform (DFT) of digital samples of received satellite signals;

generating, at the processor, a set of control parameters based on the DFT of the digital samples;

adjusting a time-domain interference mitigation (TDIM) circuit and a frequency-domain interference mitigation (FDIM) circuit using the set of control parameters, the set of control parameters including filter coefficients for a set of notch filters of the TDIM circuit;

performing time-domain filtering of the digital samples at the TDIM circuit using the set of notch filters to produce intermediate digital samples; and performing frequency-domain filtering of the intermediate digital samples at the FDIM circuit using one or more parallel mitigation paths of the FDIM circuit to produce output digital samples.

11. The method of claim 10, further comprising:

identifying, at the processor, a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency; and identifying, at the processor, a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

12. The method of claim 10, wherein the set of control parameters include filter deactivation indicators that indicate which of the set of notch filters are to be bypassed.

13. The method of claim 10, further comprising, for each of the parallel mitigation paths:

calculating a hardware DFT of the intermediate digital samples;

attenuating values of the hardware DFT of the intermediate digital samples; and converting the hardware DFT of the intermediate digital samples into time-domain samples.

14. The method of claim 13, wherein the mitigation circuit is configured to compare bins of the hardware DFT to a threshold and to attenuate the values of any of the bins having values greater than the threshold.

15. The method of claim 14, wherein the set of control parameters include the threshold.

16. A non-transitory computer-readable medium comprising instructions that, when executed by a processor, cause the processor to perform operations comprising:

computing a discrete Fourier transform (DFT) of digital samples of received satellite signals;

generating a set of control parameters based on the DFT of the digital samples; and adjusting a time-domain interference mitigation (TDIM) circuit and a frequency-domain interference mitigation (FDIM) circuit using the set of control parameters, the set of control parameters including filter coefficients for a set of notch filters of the TDIM circuit;

wherein the TDIM circuit is configured to perform time-domain filtering of the digital samples using the set of notch filters to produce intermediate digital samples;

wherein the FDIM circuit is configured to perform frequency-domain filtering of the intermediate digital samples using one or more parallel mitigation paths of the FDIM circuit to produce output digital samples.

17. The non-transitory computer-readable medium of claim 16, wherein the operations further comprise:

identifying, at the processor, a first spectral peak in the DFT of the digital samples and a first frequency corresponding to the first spectral peak, wherein the set of control parameters include first filter coefficients for a first notch filter of the set of notch filters, wherein the first filter coefficients are generated such that the first notch filter includes a first stop band centered at the first frequency; and identifying, at the processor, a second spectral peak in the DFT of the digital samples and a second frequency corresponding to the second spectral peak, wherein the set of control parameters include second filter coefficients for a second notch filter of the set of notch filters, wherein the second filter coefficients are generated such that the second notch filter includes a second stop band centered at the second frequency.

18. The non-transitory computer-readable medium of claim 16, wherein the set of control parameters include filter deactivation indicators that indicate which of the set of notch filters are to be bypassed.

19. The non-transitory computer-readable medium of claim 16, further comprising, for each of the parallel mitigation paths:

calculating a hardware DFT of the intermediate digital samples;

attenuating values of the hardware DFT of the intermediate digital samples; and converting the hardware DFT of the intermediate digital samples into time-domain samples.

20. The non-transitory computer-readable medium of claim 19, wherein the mitigation circuit is configured to compare bins of the hardware DFT to a threshold and to attenuate the values of any of the bins having values greater than the threshold, and wherein the set of control parameters include the threshold.

* * * * *